United States Patent
Chapman et al.

(10) Patent No.: US 8,759,238 B2
(45) Date of Patent: Jun. 24, 2014

(54) ION EXCHANGEABLE GLASSES

(75) Inventors: Christy Lynn Chapman, Painted Post, NY (US); Matthew John Dejneka, Corning, NY (US); Sinue Gomez, Corning, NY (US); Lisa Ann Lamberson, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 81 days.

(21) Appl. No.: 12/788,525

(22) Filed: May 27, 2010

(65) Prior Publication Data

US 2011/0294648 A1    Dec. 1, 2011

(51) Int. Cl.
    *C03C 3/097*        (2006.01)
    *C03C 3/083*        (2006.01)
    *C03C 21/00*       (2006.01)

(52) U.S. Cl.
    USPC ............... 501/63; 501/66; 501/68; 428/410; 65/30.13

(58) Field of Classification Search
    USPC ............... 501/63, 66, 68; 428/410; 65/30.13
    See application file for complete search history.

(56) References Cited

U.S. PATENT DOCUMENTS

| | | | |
|---|---|---|---|
| 3,395,998 A | | 8/1968 | Olcott |
| 3,433,611 A | | 3/1969 | Saunders et al. |
| 3,485,647 A | | 12/1969 | Harrington |
| 4,053,679 A | | 10/1977 | Rinehart |
| 4,055,703 A | | 10/1977 | Rinehart |
| 6,518,211 B1 * | | 2/2003 | Bradshaw et al. ............ 501/69 |
| 7,323,426 B2 * | | 1/2008 | Aitken ........................... 501/63 |
| 2009/0129061 A1 * | | 5/2009 | Fechner et al. ............ 362/97.2 |
| 2010/0035745 A1 | | 2/2010 | Murata |

FOREIGN PATENT DOCUMENTS

| | | | |
|---|---|---|---|
| EP | 2263979 A1 | | 12/2011 |
| JP | 01-167245 | * | 6/1989 |
| JP | 2011057504 A | | 3/2011 |
| WO | 2011022661 A2 | | 2/2011 |

* cited by examiner

*Primary Examiner* — Karl Group
(74) *Attorney, Agent, or Firm* — Robert P. Santandrea

(57) ABSTRACT

An ion exchangeable glass that is free of lithium and comprising 0.1-10 mol % $P_2O_5$ and at least 5 mol % $Al_2O_3$. The presence of $P_2O_5$ enables the glass to be ion exchanged more quickly and to a greater depth than comparable glasses that do not contain $P_2O_5$.

34 Claims, 5 Drawing Sheets

ION EXCHANGEABLE GLASSES

BACKGROUND

Chemically strengthened glasses are used in touch screen and applications. Currently, many glasses must be ion exchanged by immersion in a molten salt bath for 8 to 10 hours to achieve a compressive layer of more than 50 microns deep with at least 500 MPa compressive stress at the surface.

SUMMARY

An ion exchangeable glass comprising 0.1-10 mol % $P_2O_5$ is provided. The presence of $P_2O_5$ enables the glass to be ion exchanged more quickly and to a greater depth than comparable glasses that do not contain $P_2O_5$.

Accordingly, one aspect of the disclosure is to provide an ion exchangeable aluminosilicate glass. The ion exchangeable aluminosilicate glass is free of lithium and comprises 0.1-10 mol % $P_2O_5$ and at least 5 mol % $Al_2O_3$. The glass has a liquidus viscosity of at least 100 kpoise.

Another aspect of the disclosure is to provide a method of strengthening an ion exchangeable aluminosilicate glass. The method comprises providing an ion exchangeable aluminosilicate glass comprising 0.1-10 mol % $P_2O_5$, at least 5 mol % $Al_2O_3$, and a plurality of first monovalent cations; and exchanging at least a portion of the first monovalent cations with second monovalent cations to a depth of at least 20 μm in the glass article, wherein the second monovalent cations are different from the first monovalent cations. The exchanging of the second actions for the first cations in the glass article creates a compressive stress in a region adjacent to a surface of the glass article.

These and other aspects, advantages, and salient features will become apparent from the following detailed description, the accompanying drawings, and the appended claims.

DETAILED DESCRIPTION

Figure 1:
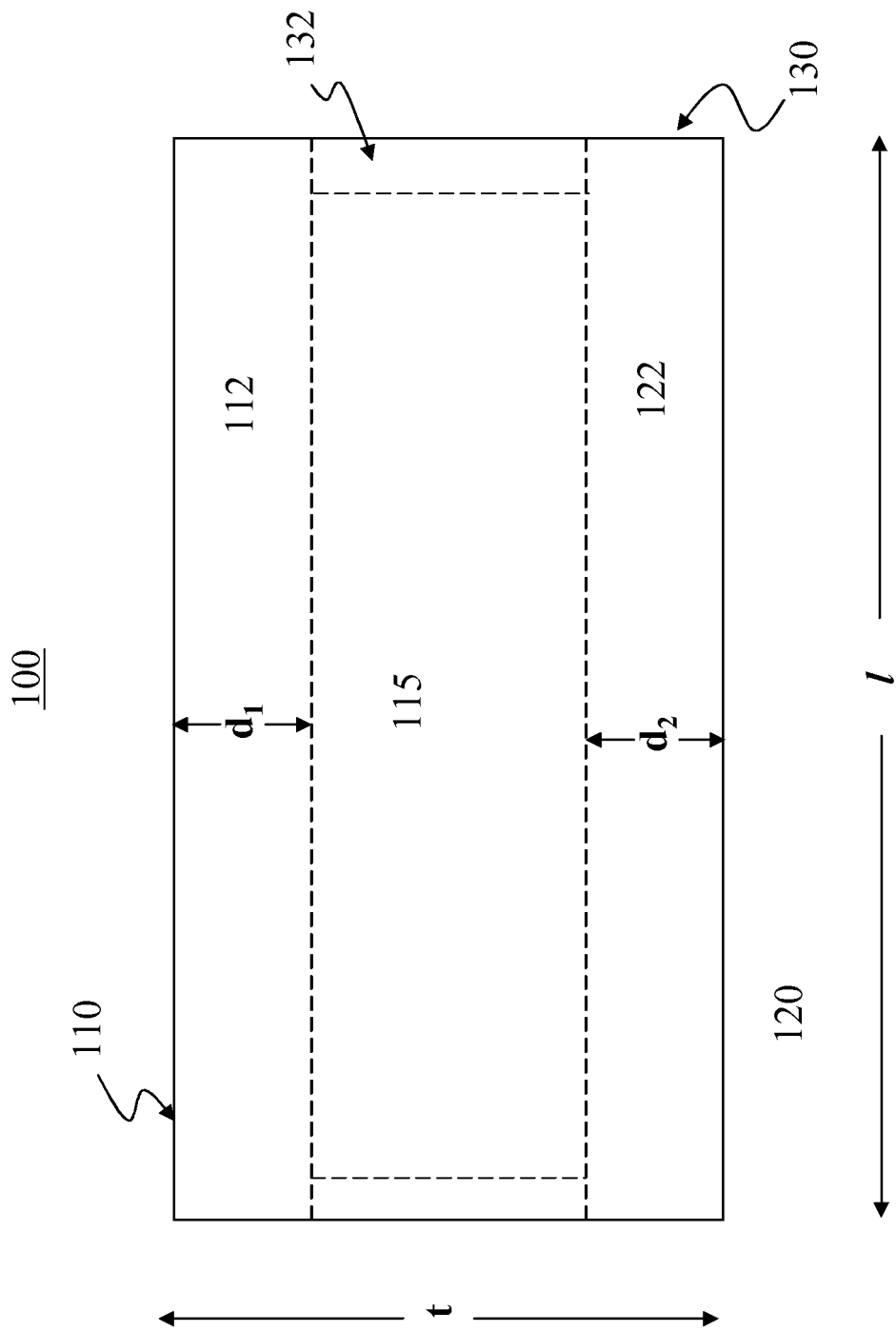
FIG. 1 is a schematic cross-sectional view of a glass sheet strengthened by ion exchange.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range. Unless otherwise specified, all concentrations of elements and compounds are expressed in mole percent (mol %).

Referring to the drawings in general and to FIG. 1 in particular, it will be understood that the illustrations are for the purpose of describing particular embodiments and are not intended to limit the disclosure or appended claims thereto. The drawings are not necessarily to scale, and certain features and certain views of the drawings may be shown exaggerated in scale or in schematic in the interest of clarity and conciseness.

Chemically strengthened glasses are used in display applications such as touch screens and ruggedized displays in mobile consumer electronics, including cell phones, mobile internet devices, entertainment devices, laptop and notebook computers, and the like. Some glasses, such as aluminosilicate glasses and alkali aluminosilicate glasses, can be strengthened chemically by a process known as ion exchange. In this process, ions in the surface layer of the glass are replaced by—or exchanged with—larger ions having the same valence or oxidation state as the ions in the surface layer of the glass. In those embodiments in which the glass comprises, consists essentially of, or consists of an alkali aluminosilicate glass, ions in the surface layer of the glass and the larger ions are monovalent alkali metal cations, such as $Li^+$ (when present in the glass), $Na^+$, $K^+$, $Rb^+$, and $Cs^+$. Alternatively, monovalent cations in the surface layer may be replaced with monovalent cations other than alkali metal cations, such as $Ag^+$, $Cu^+$, $Tl^+$, or the like. In addition, such cations can be initially present in the glass itself.

Ion exchange processes typically include immersing the aluminosilicate glass in a molten salt bath containing the larger ions to be exchanged with the smaller ions in the glass. By way of example, ion exchange of alkali metal-containing glasses may be achieved by immersion in at least one molten salt bath containing a salt such as, but not limited to, nitrates, sulfates, and chlorides of the larger alkali metal ion. The temperature of the molten salt bath is typically in a range from about 380° C. up to about 450° C., and immersion times range from about 2 hours up to about 16 hours. Such ion exchange treatments typically result in strengthened alkali aluminosilicate glasses having an outer surface layer (also referred to herein as the "depth of layer" or "DOL") that is under compressive stress (CS).

A cross-sectional view of a glass sheet strengthened by ion exchange is schematically shown in FIG. 1. Strengthened glass sheet 100 has a thickness t, a first surface 110 and second surface 120 that are substantially parallel to each other, central portion 115, and edges 130 joining first surface 110 to second surface 120. Strengthened glass sheet 100 is chemically strengthened by ion exchange, and has strengthened surface layers 112, 122 extending from first surface 110 and second surface 120, respectively, to depths $d_1$, $d_2$ below each surface. Strengthened surface layers 112, 122 are under a compressive stress, while central portion 115 is under a tensile stress, or in tension. The tensile stress in central portion 115 balances the compressive stresses in strengthened surface layers 112, 122, thus maintaining equilibrium within strengthened glass sheet 100. The depths $d_1$, $d_2$ to which the strengthened surface layers 112, 122 extend are generally referred to individually as the "depth of layer (DOL)." A portion 132 of edge 130 may also be strengthened as a result of the strengthening process. Thickness t of strengthened glass sheet 100 is generally in a range from about 0.1 mm up to about 3 mm. In one embodiment, thickness t is in a range from about 0.5 mm up to about 1.3 mm. Whereas a planar glass sheet 100 is shown in FIG. 1, other non-planar configurations, such as a three dimensional form, are possible. In addition, a single surface of the glass sheet can be strengthened by ion exchange.

In order to achieve a desired depth of compressive layer of more than 50 μm and/or a desired compressive stress of at least 500 MPa at the surface, alkali aluminosilicate glasses typically undergo chemical strengthening by ion exchange ion exchange for 8 to 10 hours.

Described herein is an ion exchangeable aluminosilicate glass and articles made therefrom that are capable of undergoing ion exchange at rates that are up to four times faster than those previously observed for such glasses. The aluminosilicate glasses are ion exchangeable with at least one of sodium, potassium, rubidium, cesium, copper, silver, thallium, and the like.

The glasses described herein is substantially free of lithium (i.e., lithium is not actively added to the glass during initial batching or subsequent ion exchange, but may be present as an impurity) and comprises from about 0.1 mol % up to about 10 mol % $P_2O_5$ and at least 5 mol % $Al_2O_3$. The glass has a liquidus viscosity of at least 100 kpoise and, in some embodiments, at least 135 kpoise, which allows the glass to be formed by down-draw methods (e.g., slot-draw or fusion-draw) methods known in the art. In selected embodiments, the glass has a liquidus viscosity of at least 2 megapoise (Mpoise).

In some embodiments, the $P_2O_5$ concentration is less than or equal to the difference between the total concentration of metal oxide modifiers $\Sigma(R_2O)$ and the $Al_2O_3$ concentration—i.e., $P_2O_5 \leq [\Sigma(R_2O)-Al_2O_3]$. In one embodiment, the glass is an alkali aluminosilicate glass that includes at least one monovalent metal oxide modifier—e.g., $Ag_2O$, $Na_2O$, $K_2O$, $Rb_2O$, and/or $Cs_2O$. In such glasses, the $P_2O_5$ concentration is less than or equal to the difference between the total concentration of alkali metal oxide modifiers and the $Al_2O_3$ concentration—i.e., $P_2O_5 \leq [(Na_2O+K_2O+Rb_2O+Cs_2O)-Al_2O_3]$. When the $P_2O_5$ content exceeds the excess amount of alkali modifiers, refractory batch stones and aluminum phosphate inclusions begin to form in the glass. Alkaline earth oxides like MgO, CaO, SrO, and BaO can cause phase separation and/or devitrification. Consequently, the total concentration of alkaline earth oxides should be limited to approximately no more than one half of the $P_2O_5$ concentration; i.e., $\Sigma R'O$ (R=Mg, Ca, Ba, Sr)$\leq 0.5$ $P_2O_5$. Similarly, in those embodiments where the modifiers are other metal oxides such as $Ag_2O$, $Cu_2O$, or $Tl_2O$, the $P_2O_5$ concentration is less than or equal to the difference between the total concentration of metal oxide modifiers and the $Al_2O_3$ concentration—i.e., $P_2O_5 \leq [(Ag_2O+Tl_2O+Cu_2O-Al_2O_3)]$.

In one embodiment, the ion exchangeable aluminosilicate glass is an alkali aluminosilicate glass that comprises, consists essentially of, or consists of: 56-72 mol % $SiO_2$; 5-18 mol % $Al_2O_3$; 0-15 mol % $B_2O_3$; 0.1-10 mol % $P_2O_5$; 3-25 mol % $Na_2O$; and 0-5 mol % $K_2O$; and is free of lithium. The alkali aluminosilicate glass can, in some embodiments, further include at least one of: 0-4 mol % CaO; 0-1 mol % MgO; and up to 0.5 mol % $SnO_2$. Exemplary compositions of the glasses described herein are listed in Table 1. Physical properties, including strain, anneal, and softening points, coefficient of thermal expansion (CTE), density, molar volume, stress optical coefficient (SOC), and liquidus temperature of these glasses are listed in Table 2. Table 3 lists compressive stresses (CS), depth of layer (DOL), and potassium diffusivity (D) for selected glasses after ion exchange for 8 hours in a $KNO_3$ bath at either 410° C. or 370° C. In another embodiment, the glass is an aluminosilicate glass that comprises, consists essentially of, or consists of: 56-72 mol % $SiO_2$; 5-18 mol % $Al_2O_3$; 0-15 mol % $B_2O_3$; 0.1-10 mol % $P_2O_5$; and 2-20 mol % $Ag_2O$. This glass as well, in some embodiments, is free of lithium.

Figure 2:
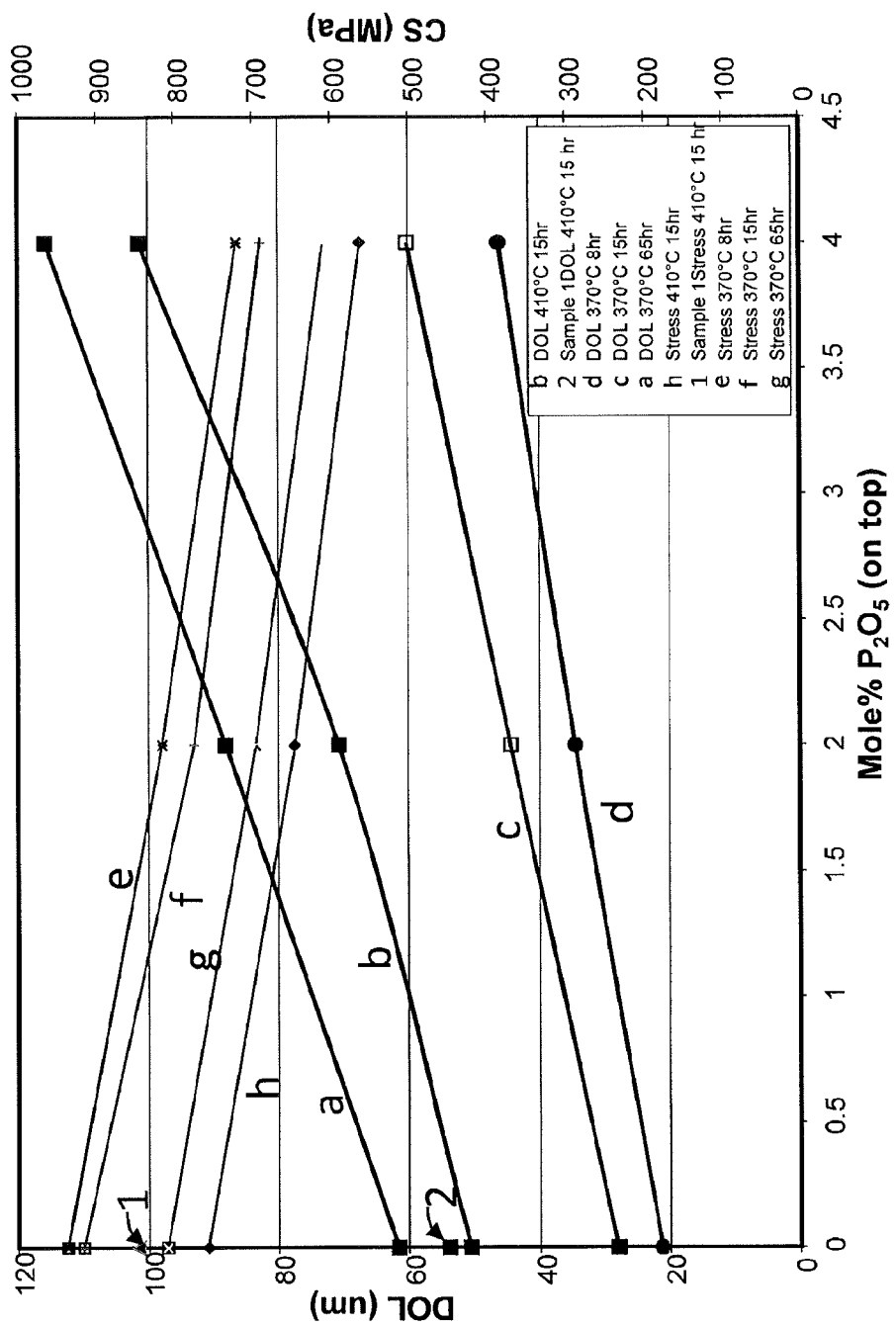
FIG. 2 is a plot of depth of compressive layer and compressive stress in ion exchanged alkali aluminosilicate glasses as a function of $P_2O_5$ content.
Figure 3:
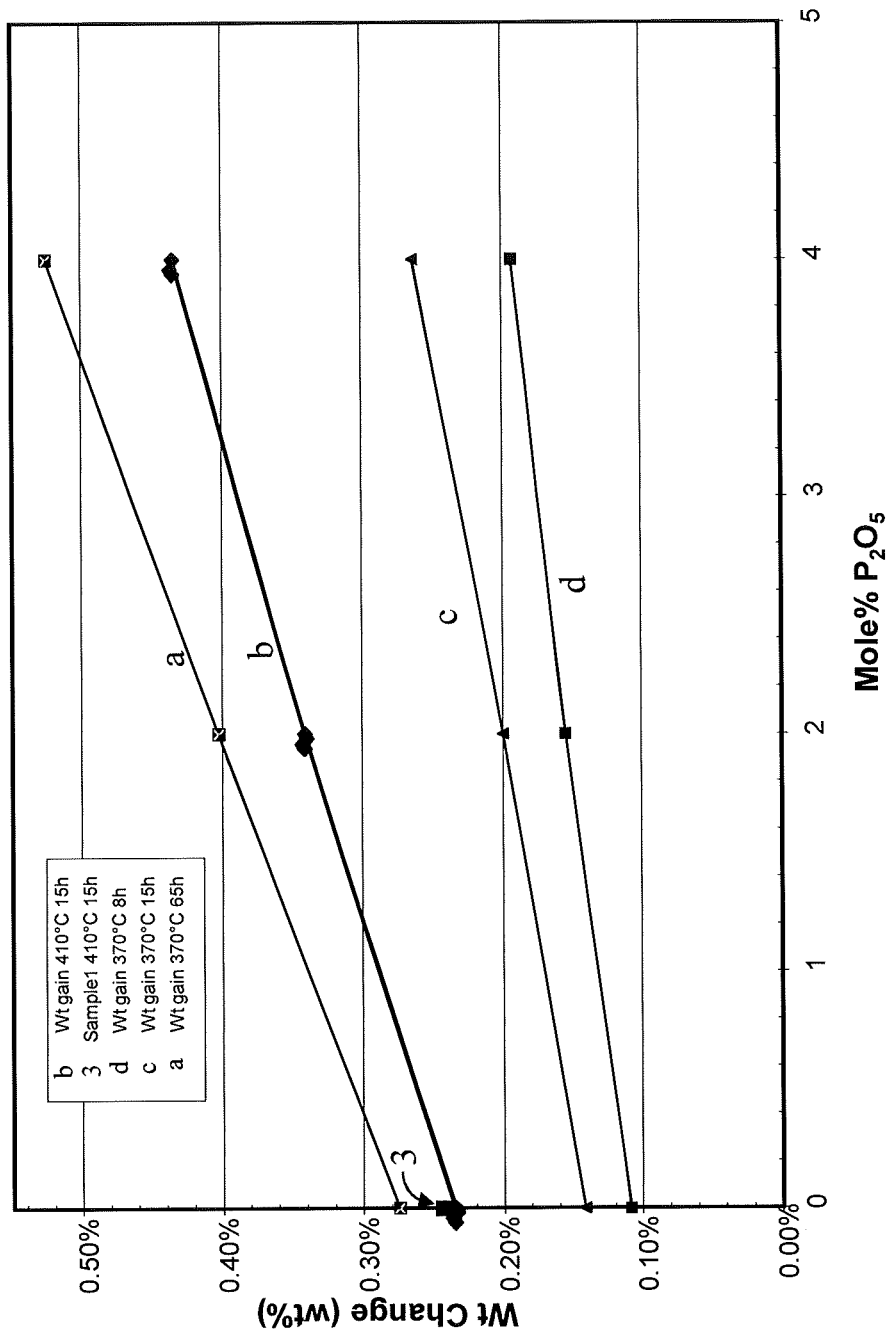
FIG. 3 is a plot of weight change of ion exchanged alkali aluminosilicate glasses as a function of $P_2O_5$ content.
Figure 4:
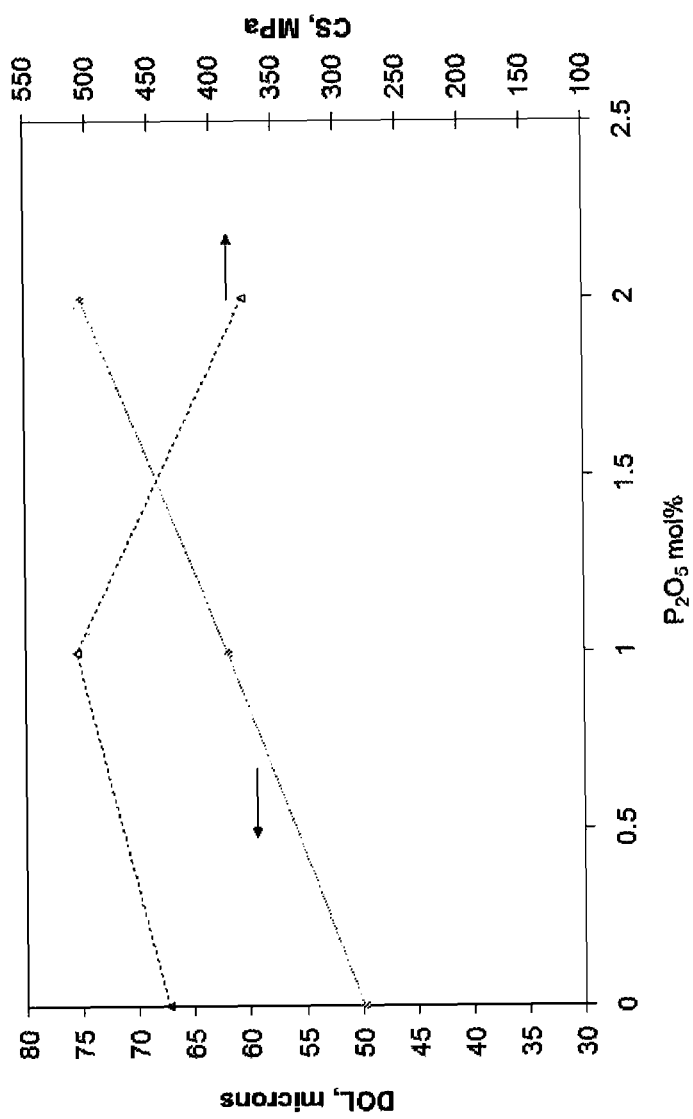
FIG. 4 is a plot of depth of compressive layer and compressive stress as a function of $P_2O_5$ addition to an alkali aluminosilicate glass.

The presence of $P_2O_5$ in the aluminosilicate or alkali aluminosilicate glass accelerates the rate of ion exchange of larger cations for smaller cations present in the glass. In particular, the presence of $P_2O_5$ accelerates the rate of ion exchange of $K^+$ ions for $Na^+$ ions in alkali aluminosilicate glasses. The data listed in Tables 1-3 show the effect of $P_2O_5$ concentration on ion exchange and physical properties of alkali aluminosilicate glasses. Curves a-d in FIG. 2 show the increase in DOL in ion exchanged alkali aluminosilicate glasses with increasing $P_2O_5$ content, whereas curves e-h show the decrease in compressive stress CS with increasing $P_2O_5$ content for ion exchanged alkali aluminosilicate glasses for different bath temperatures (410° C., 370° C.) and times (8, 15, and 64 hours). Points 1 and 2 represent the compressive stress and depth of layer, respectively, of an alkali aluminosilicate glass reference sample (Example 1 in Tables 1-3) that had been ion exchanged and annealed and that does not contain $P_2O_5$. The weight gains of selected ion exchanged alkali aluminosilicate glasses listed in Table 3 are plotted as a function of $P_2O_5$ content in FIG. 3. The weight gains shown in FIG. 3 were measured for different ion exchange conditions—for different bath temperatures (410° C., 370° C.) and times (8, 15, and 64 hours)—and reflect the extent of exchange of heavier $K^+$ ions for $Na^+$ ions in the glasses. Point 3 in FIG. 3 represents the weight change observed for an alkali aluminosilicate glass reference sample (sample 1 in Tables 1-3) that does not contain $P_2O_5$ and had been annealed and ion exchanged. The steady increase in weight with $P_2O_5$ content indicates that the presence of $P_2O_5$ in the glasses described herein promotes and/or accelerates the exchange of $K^+$ for $Na^+$ ions. FIG. 4 is a plot the effect of $P_2O_5$ addition on depth of layer and compressive stress of alkali aluminosilicate glasses having the composition 66 mol % $SiO_2$, 25 mol % $Na_2O$, and 9 mol % $Al_2O_3$. As can be seen in FIG. 4, the addition of 2 mol % $P_2O_5$ results in a 50% increase in depth of layer.

The ion exchange data listed in Table 3 and plotted in FIG. 2 show that 4 mole % $P_2O_5$ is sufficient to double the DOL in alkali aluminosilicate glasses. Since DOL increases as approximately the square root of time and diffusivity, this implies that the coupled $K^+ \leftrightarrow Na^+$ diffusivity is increased by a factor of four. Thus, the addition of $P_2O_5$ to a glass can decrease the time needed to achieve a given depth of layer by a factor of four. The diffusivity D of $K^+$ ions in a phosphorus-free annealed alkali aluminosilicate glass (sample 1 in Tables 1-3) is given by the equation $$D = \exp(-3.8965 - 13240/T),$$

where the diffusivity D is expressed in ($cm^2/sec$) and the temperature T is expressed in degrees Kelvin (K). At 410° C. (683 K), which is a temperature at which the exchange of $K^+$ ions for $Na^+$ ions is typically carried out, the diffusivity of $K^+$ ions in the glasses described herein is $7.8 \times 10^{-11}$ $cm^2/sec$. The equation provided above is derived for annealed glasses. As previously described herein, alkali aluminosilicate glasses can be formed by down-draw processes such as fusion-draw processes. The diffusivity of $K^+$ ions in fusion-formed glasses can be taken to be about 1.4 times greater than the diffusivity of these ions in annealed glass. Thus, the diffusivity of $K^+$ ions in fusion-formed alkali aluminosilicate glasses is estimated to be about $1.1 \times 10^{-10}$ $cm^2/sec$ at 400° C. (673 K). The faster $K^+ \leftrightarrow Na^+$ ion exchange rates that are enabled by the enhanced diffusivity of alkali metal ions in the phosphorus-containing glasses described herein have been previously achieved only with smaller ions, such as $Na^+ \leftrightarrow Li^+$, which produces a lower compressive stress than $K^+ \leftrightarrow Na^+$ ion exchange. Thus, the compositions described herein permit compressive stresses achievable with $K^+ \leftrightarrow Na^+$ ion exchange to be carried out at the speed or rate of $Na^+ \leftrightarrow Li^+$ ion exchange. In one embodiment, the alkali aluminosilicate glasses described herein, when immersed in a $KNO_3$ molten salt bath at 410° C. for less than six hours, are capable of exchanging $K^+$ for $Na^+$ in the glass to a depth of at least 50 μm. In some embodiments, the alkali aluminosilicate glasses described herein, when ion exchanged, have a compressive layer with a depth of layer of at least 20 μm and a compressive stress of at least 400 MPa. In other embodiments, the glasses are ion exchanged to a depth of layer of up to 150 μm, and in still other embodiments, the glasses are ion exchanged to a depth of layer of up to 100 μm.

Figure 5:
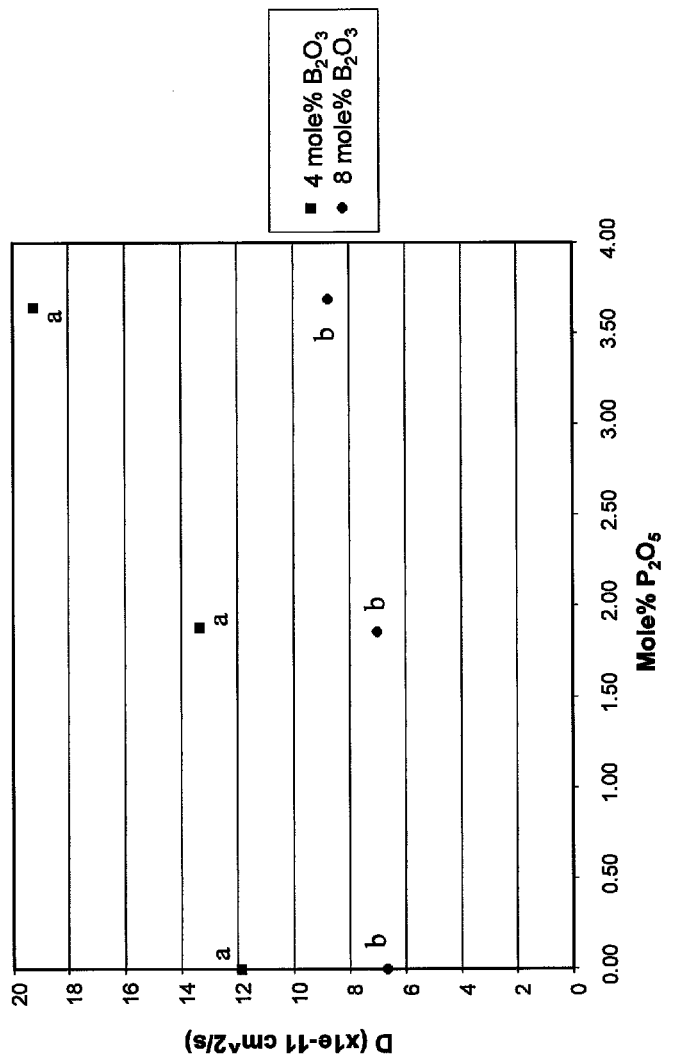
FIG. 5 is a plot of potassium diffusivity as a function of $P_2O_5$ concentration in alkali aluminosilicate glass.

Potassium diffusivity is plotted as a function of $P_2O_5$ concentration in two alkali aluminosilicate glasses in FIG. 5. Data for two glasses containing either 4 mol % (a in FIG. 5) or 8 mol % (b in FIG. 5) $B_2O_3$ are plotted in FIG. 5. The addition of 4 mol % $P_2O_5$, increases the $K^+$ diffusivity in the glasses containing 4 mol % $B_2O_3$ by about 50%, whereas the addition of the same amount of $P_2O_5$ to the glass glasses containing 8 mol % $B_2O_3$ yields an increase in $K^+$ diffusivity of about one third. The lower increase in diffusivity observed in the latter glass can be attributed to the increased amount of $B_2O_3$, which tends to reduce $K^+$ diffusivity in glass.

The addition of $P_2O_5$ to alkali aluminosilicate glasses also can be used to obtain low liquidus temperatures. All the glasses listed in Table 1 have liquidus temperatures of less than about 700° C. Glass #2 has a liquidus viscosity over 248 million Poise (MP), and is therefore formable by down-draw methods, such as slot-draw and fusion draw methods that are known in the art. Alternatively, the glasses described herein are also formable by other methods, such as float, molding, and casting methods that are known in the art. The presence of $P_2O_5$ also decreases the viscosity of the glass at high temperatures. An addition of 2 mole % $P_2O_5$ is capable of lowering the 200P temperature of the alkali aluminosilicate glass by 50° C., which facilitates melting and fining of the glass.

A method of strengthening a glass article is also provided. A glass article comprising an aluminosilicate glass comprising 0.1-10 mol % $P_2O_5$ and at least 5 mol % $Al_2O_3$, such as those glasses described herein, is first provided. The glass also includes a plurality of first monovalent cations such as, for example, an alkali metal cation or a monovalent cation such as $Ag^+$, $Cu^+$, $Tl^+$, or the like. In some embodiments, the aluminosilicate glass is an alkali aluminosilicate glass is lithium-free and comprises, consists essentially of, or consists of: 56-72 mol % $SiO_2$; 5-18 mol % $Al_2O_3$; 0-15 mol % $B_2O_3$; 0.1-10 mol % $P_2O_5$; 3-25 mol % $Na_2O$; and 0-5 mol % $K_2O$. The alkali aluminosilicate glass can, in some embodiments, further include at least one of 0-4 mol % CaO; 0-1 mol % MgO; and up to 0.5 mol % $SnO_2$. The glass has a liquidus viscosity of at least 100 kP and, in some embodiments, at least 135 kP, and can be made by those down-draw methods (e.g., slot-draw, fusion-draw, or the like). In addition, the alkali aluminosilicate glass possesses those properties (strain, anneal, and softening points, coefficient of thermal expansion (CTE), density, molar volume, stress optical coefficient (SOC), and liquidus temperature) previously described herein and reported in Table 1b. In other embodiments, the glass is an aluminosilicate glass comprising, consisting essentially of, or consisting of: 56-72 mol % $SiO_2$; 5-18 mol % $Al_2O_3$; 0-15 mol % $B_2O_3$; 0.1-10 mol % $P_2O_5$; and 2-20 mol % $Ag_2O$.

In the next step, second monovalent cations are exchanged for—or replaces—at least a portion the first monovalent cations in a region adjacent to the surface of the glass. The second monovalent cation is different from the first cation and, in some embodiments, larger than the first monovalent cation. In those instances where the second cation is larger than the first cation, the replacement of first cations with second cations in the region adjacent to the surface of the glass creates a compressive stress in that region. In those instances where the glass is an alkali aluminosilicate glass, for example, $K^+$ ions are exchanged for $Na^+$ ions in the alkali aluminosilicate glass by ion exchange, using those methods previously described herein. Potassium ions are ion exchanged for $Na^+$ ions to a depth of up to up to 100 μm in the glass article and, in some embodiments, up to 150 μm. In some embodiments, $K^+$ ions are exchanged for $Na^+$ ions to a depth of at least 20 μm in the glass article, in other embodiments, at least 50 μm, and in still other embodiments, to a depth of 150 μm.

The glasses described herein can be formed into planar sheets for use as display windows, cover plates, screens, structural features, and the like, for applications such as, but not limited to, touch screens and mobile electronic devices, including telephones and other communication devices, entertainment devices, and hand-held, laptop and notebook computers. In other embodiments, the alkali aluminosilicate glass can be formed into three dimensional, non-planar shapes, such as curved sheets or the like.

TABLE 1

Compositions of alkali aluminosilicate glasses.

| Sample Number | mol % | | | | | | | | | |
|---|---|---|---|---|---|---|---|---|---|---|
| | $SiO_2$ | $Al_2O_3$ | $B_2O_3$ | $Na_2O$ | $K_2O$ | MgO | CaO | $SnO_2$ | $P_2O_5$ | $As_2O_3$ |
| 1 | 66.4 | 10.31 | 0.602 | 14.02 | 2.1 | 5.76 | 0.58 | 0.207 | 0 | 0 |
| 2 | 66.4 | 10.31 | 0.602 | 14.02 | 2.1 | 5.76 | 0.58 | 0.207 | 0 | 0 |
| 19 | 61.53 | 11.51 | 5.73 | 15.30 | 1.93 | 0.02 | 0.05 | 0.10 | 3.84 | 0.00 |
| 20 | 60.36 | 11.29 | 4.69 | 15.96 | 1.89 | 0.02 | 0.05 | 0.09 | 5.65 | 0.00 |
| 21 | 59.24 | 11.09 | 4.60 | 15.66 | 1.85 | 0.02 | 0.05 | 0.09 | 7.39 | 0.00 |
| 22 | 58.16 | 10.88 | 4.51 | 15.38 | 1.82 | 0.02 | 0.05 | 0.09 | 9.07 | 0.00 |
| 23 | 61.52 | 12.00 | 4.78 | 15.79 | 1.93 | 0.00 | 0.05 | 0.10 | 3.83 | 0.00 |
| 24 | 61.53 | 12.48 | 4.77 | 15.30 | 1.93 | 0.00 | 0.05 | 0.10 | 3.84 | 0.00 |
| 25 | 61.52 | 13.43 | 4.78 | 14.35 | 1.92 | 0.00 | 0.05 | 0.10 | 3.84 | 0.00 |
| 26 | 61.52 | 11.51 | 4.77 | 15.31 | 1.92 | 0.97 | 0.05 | 0.10 | 3.84 | 0.00 |
| 27 | 61.52 | 11.51 | 4.78 | 14.35 | 1.93 | 1.94 | 0.05 | 0.10 | 3.84 | 0.00 |
| 28 | 61.51 | 11.51 | 4.77 | 13.39 | 1.93 | 2.91 | 0.05 | 0.10 | 3.84 | 0.00 |

TABLE 1-continued

Compositions of alkali aluminosilicate glasses.

| Sample Number | SiO$_2$ | Al$_2$O$_3$ | B$_2$O$_3$ | Na$_2$O | K$_2$O | MgO | CaO | SnO$_2$ | P$_2$O$_5$ | As$_2$O$_3$ |
|---|---|---|---|---|---|---|---|---|---|---|
| 29 | 63.96 | 11.97 | 4.97 | 15.92 | 2.00 | 0.02 | 0.05 | 0.10 | 1.00 | 0.00 |
| 30 | 63.96 | 11.97 | 4.96 | 15.93 | 0.00 | 0.02 | 0.05 | 0.10 | 3.00 | 0.00 |
| 31 | 63.97 | 11.98 | 5.96 | 15.43 | 0.80 | 0.02 | 0.05 | 0.10 | 1.60 | 0.00 |
| 32 | 63.96 | 11.97 | 5.96 | 14.93 | 2.00 | 0.02 | 0.05 | 0.10 | 1.00 | 0.00 |
| 33 | 63.98 | 11.97 | 5.96 | 12.93 | 2.00 | 0.02 | 0.04 | 0.10 | 2.99 | 0.00 |
| 34 | 63.98 | 11.97 | 5.96 | 10.95 | 2.00 | 0.02 | 0.04 | 0.10 | 4.98 | 0.00 |
| 35 | 63.96 | 12.08 | 5.96 | 15.43 | 0.80 | 0.02 | 0.05 | 0.10 | 1.60 | 0.00 |
| 36 | 63.98 | 12.22 | 7.45 | 14.68 | 0.05 | 0.02 | 0.05 | 0.10 | 1.00 | 0.00 |
| 37 | 63.99 | 12.38 | 8.93 | 13.93 | 0.20 | 0.02 | 0.05 | 0.10 | 0.40 | 0.00 |
| 38 | 63.79 | 11.94 | 5.94 | 15.87 | 1.99 | 0.02 | 0.05 | 0.10 | 0.30 | 0.00 |
| 39 | 63.65 | 11.92 | 5.93 | 15.84 | 1.99 | 0.02 | 0.05 | 0.10 | 0.50 | 0.00 |
| 40 | 63.46 | 11.88 | 5.91 | 15.80 | 1.98 | 0.02 | 0.05 | 0.10 | 0.79 | 0.00 |
| 41 | 63.97 | 11.47 | 9.93 | 12.44 | 1.00 | 0.02 | 0.05 | 0.12 | 1.00 | 0.00 |
| 42 | 63.97 | 10.48 | 9.93 | 12.43 | 1.00 | 0.02 | 0.05 | 0.12 | 2.00 | 0.00 |
| 43 | 64.04 | 13.59 | 8.11 | 13.54 | 0.51 | 0.02 | 0.07 | 0.10 | 0.00 | 0.00 |
| 44 | 64.52 | 11.55 | 7.99 | 13.38 | 0.50 | 0.02 | 0.07 | 0.10 | 1.86 | 0.00 |
| 45 | 64.81 | 9.57 | 7.94 | 13.30 | 0.49 | 0.02 | 0.06 | 0.10 | 3.69 | 0.00 |
| 46 | 64.08 | 15.63 | 3.97 | 15.60 | 0.52 | 0.01 | 0.07 | 0.10 | 0.00 | 0.00 |
| 47 | 64.44 | 13.57 | 4.04 | 15.35 | 0.51 | 0.02 | 0.07 | 0.10 | 1.88 | 0.00 |
| 48 | 64.84 | 11.55 | 4.00 | 15.26 | 0.50 | 0.02 | 0.06 | 0.10 | 3.65 | 0.00 |
| 49 | 63.95 | 13.71 | 5.95 | 13.67 | 0.50 | 0.02 | 0.10 | 0.10 | 2.00 | 0.00 |
| 50 | 63.93 | 13.71 | 3.98 | 13.68 | 0.50 | 0.02 | 0.10 | 0.10 | 3.99 | 0.00 |
| 51 | 63.94 | 11.96 | 3.97 | 15.42 | 0.50 | 0.02 | 0.10 | 0.10 | 3.99 | 0.00 |
| 52 | 63.94 | 12.96 | 3.97 | 14.42 | 0.50 | 0.02 | 0.10 | 0.10 | 3.99 | 0.00 |
| 53 | 63.95 | 13.96 | 3.97 | 13.42 | 0.50 | 0.02 | 0.09 | 0.10 | 3.99 | 0.00 |
| 54 | 63.93 | 14.96 | 3.98 | 12.43 | 0.50 | 0.02 | 0.09 | 0.10 | 3.99 | 0.00 |
| 55 | 60.18 | 12.48 | 9.93 | 15.63 | 0.60 | 0.02 | 0.05 | 0.10 | 1.00 | 0.00 |
| 56 | 58.19 | 12.48 | 9.93 | 15.63 | 0.60 | 0.02 | 0.04 | 0.10 | 3.00 | 0.00 |
| 57 | 60.90 | 12.42 | 9.88 | 15.55 | 0.60 | 0.02 | 0.05 | 0.10 | 0.50 | 0.00 |
| 58 | 60.59 | 12.36 | 9.83 | 15.47 | 0.60 | 0.02 | 0.05 | 0.10 | 0.99 | 0.00 |
| 59 | 59.43 | 12.11 | 9.64 | 15.17 | 0.58 | 0.02 | 0.04 | 0.10 | 2.91 | 0.00 |
| 60 | 58.30 | 11.88 | 9.47 | 14.88 | 0.57 | 0.02 | 0.04 | 0.09 | 4.76 | 0.00 |
| 61 | 61.85 | 11.63 | 7.72 | 15.17 | 0.58 | 0.02 | 0.04 | 0.10 | 2.91 | 0.00 |
| 62 | 61.20 | 12.48 | 9.43 | 15.63 | 0.60 | 0.02 | 0.05 | 0.10 | 0.50 | 0.00 |
| 63 | 61.19 | 12.48 | 8.94 | 15.63 | 0.60 | 0.02 | 0.05 | 0.10 | 1.00 | 0.00 |
| 64 | 61.18 | 12.47 | 6.96 | 15.63 | 0.60 | 0.02 | 0.04 | 0.10 | 3.00 | 0.00 |
| 65 | 61.19 | 12.47 | 4.97 | 15.62 | 0.60 | 0.02 | 0.04 | 0.10 | 4.99 | 0.00 |
| 66 | 60.20 | 12.48 | 9.93 | 15.63 | 0.60 | 0.02 | 0.05 | 0.10 | 1.00 | 0.00 |
| 67 | 58.21 | 12.48 | 9.93 | 15.63 | 0.60 | 0.02 | 0.04 | 0.10 | 3.00 | 0.00 |
| 68 | 66 | 14 | 0 | 20 | 0 | 0 | 0 | 0 | 2 | 0.4 |
| 69 | 66 | 14 | 0 | 20 | 0 | 0 | 0 | 0 | 1 | 0.4 |
| 70 | 64 | 14 | 0 | 20 | 0 | 0 | 0 | 0 | 2 | 0.4 |
| 71 | 65 | 14 | 0 | 20 | 0 | 0 | 0 | 0 | 1 | 0.4 |
| 72 | 66 | 9 | 0 | 25 | 0 | 0 | 0 | 0 | 2 | 0.4 |
| 73 | 66 | 9 | 0 | 25 | 0 | 0 | 0 | 0 | 1 | 0.4 |
| 74 | 64 | 9 | 0 | 25 | 0 | 0 | 0 | 0 | 2 | 0.4 |
| 75 | 65 | 9 | 0 | 25 | 0 | 0 | 0 | 0 | 1 | 0.4 |

TABLE 2

Physical properties of alkali aluminosilicate glasses.

| Sample Number | Strain Point, °C. | Annealing Point, °C. | Softening point, °C. | CTE of glass < Tg × 10$^7$ K$^{-1}$ | Density at 20° C., g/cm$^3$ | Molar & spec. volume at 20° C., cm$^3$/mol | Liquidus, °C. | Liquidus viscosity, poise | 200p T, °C. | SOC (nm/cm/Mpa) |
|---|---|---|---|---|---|---|---|---|---|---|
| 1 | | | | | | | | | | 31.8 |
| 2 | | | | | | | | | | 28.8 |
| 19 | 505.3 | 550.6 | 762.2 | 87.81 | 2.409 | 28.89 | <720 | | | |

| Sample Number | Strain Point, °C. | Annealing Point, °C. | Softening point, °C. | CTE of glass < Tg × 10$^7$ K$^{-1}$ | Density at 20° C., g/cm$^3$ | Molar volume at 20° C., cm$^3$/mol | Liquidus, °C. | Liquidus viscosity, (poise) | 200p T, °C. | SOC (nm/cm/Mpa) |
|---|---|---|---|---|---|---|---|---|---|---|
| 20 | 492.4 | 539.1 | 755.5 | 91.28 | 2.405 | 29.47 | <725 | | | |
| 21 | 477.2 | 524.5 | 755.8 | 92.071 | 2.396 | 30.13 | <710 | | | |
| 22 | 475 | 526.1 | 749.6 | 93.753 | 2.387 | 30.78 | | | | |
| 23 | 515.6 | 561.8 | 775.1 | 89.283 | 2.413 | 28.89 | | | | |

TABLE 2-continued

Physical properties of alkali aluminosilicate glasses.

| | | | | | | | | |
|---|---|---|---|---|---|---|---|---|
| 24 | 514.9 | 562.2 | 789.1 | 88.739 | 2.41 | 29.01 | | |
| 25 | 523.4 | 573 | 824.1 | 84.17 | 2.395 | 29.35 | | |
| 26 | 521.7 | 570.1 | 797.8 | 90.784 | 2.412 | 28.74 | | |
| 27 | 528.5 | 578.2 | 807.5 | 90.95 | 2.41 | 28.67 | | |
| 28 | 529.9 | 581.9 | 839 | 87.405 | 2.404 | 28.66 | 1070 | |
| 29 | 527.6 | 570.7 | 761.2 | 89.733 | 2.44 | 27.64 | 820 | |
| 30 | 535.2 | 580.7 | 789.9 | 85.209 | 2.419 | 28.07 | 860 | |
| 31 | 533.3 | 580.8 | 807.3 | 83.4 | 2.4 | 28.5 | 730 | 341650833 | 1631.8 |
| 32 | 530.2 | 574.1 | 769.8 | 89.435 | 2.426 | 27.83 | 745 | |
| 33 | 520.4 | 569.7 | 806.7 | 84.477 | 2.382 | 29.01 | 750 | 200196453 | 1669.1 |
| 34 | 511 | 564.1 | 838.1 | 76.85 | 2.352 | 30.06 | | |
| 35 | 535.5 | 579.9 | 797.8 | 83.959 | 2.412 | 28.05 | | |
| 36 | 532.9 | 579.3 | 800.2 | 79.552 | 2.393 | 28.1 | | |
| 37 | 530.8 | 577.8 | 801.7 | 76.669 | 2.376 | 28.14 | | |
| 38 | 522.7 | 564 | 755.2 | 90.762 | 2.447 | 27.36 | | |
| 39 | 525.5 | 567.7 | 760.5 | 89.251 | 2.441 | 27.49 | | |
| 40 | 526 | 569.2 | 761.5 | 88.836 | 2.438 | 27.61 | | |
| 41 | 508.2 | 556.2 | 784.6 | 75.484 | 2.356 | 28.58 | | |
| 42 | 499.9 | 547 | 784.9 | 75.695 | 2.358 | 28.73 | | |

| Sample Number | Strain Point, °C. | Annealing Point, °C. | Softening point, (Littleton) °C. | TEC of glass < Tg*1e7 K−1 | Density at 20° C., g/cm^3 | Molar & spec. volume at 20° C., cm^3/mol | Liquidus, C. | Liquidus viscosity | 200p T, C. | SOC (nm/cm/Mpa) |
|---|---|---|---|---|---|---|---|---|---|---|
| 43 | 542 | 594 | 856 | 79 | 2.374 | | | | | 34.64 |
| 44 | 516 | 563 | 796 | 77.1 | 2.375 | | | | | 33.66 |
| 45 | 497 | 542 | 762 | 78.3 | 2.371 | | | | | 32.97 |
| 46 | 592 | 649 | 933 | 85.9 | 2.411 | | 790 | 864900779 | 1690.6 | 32.42 |
| 47 | 552 | 603 | 856 | 84.6 | 2.407 | | 760 | 584512466 | 1695.3 | 31.63 |
| 48 | 525 | 573 | 812 | 83.9 | 2.399 | | 790 | 4.90E+07 | 1654.5 | 31.17 |
| 49 | 546 | 603 | 882 | 77.734 | 2.375 | | 860 | | | |
| 50 | 549 | 606 | 899 | 76.448 | 2.373 | | 835 | | | |
| 51 | 527 | 576 | 816 | 84.01 | 2.397 | | 890 | | | |
| 52 | 540 | 594 | 859 | 79.742 | 2.381 | | | | | |
| 53 | 554 | 612 | 906 | 77.119 | 2.370 | | | | | |
| 54 | 578 | 641 | 955 | 71.763 | 2.358 | | | | | |
| 55 | | | | 83.4 | | | | | | |
| 56 | | | | 84.4 | | | | | | |
| 57 | 531 | 573 | | | 2.403 | | 850 | | | |
| 58 | 519 | 562 | 759 | 82 | 2.395 | | <750 | 3.42E+07 | 1550 | |
| 59 | 512 | 555 | | | 2.381 | | <785 | | | |
| 60 | 501 | 545 | 759 | 81.1 | 2.369 | | <820 | 2.87E+07 | 1545 | |
| 61 | 518 | 563 | | | 2.389 | | <795 | | | |
| 62 | 525 | 566 | | | 2.404 | | | | | |
| 63 | 528 | 572 | 767 | 82.8 | 2.4 | | <785 | 1.03E+07 | 1545 | |
| 64 | 519 | 565 | | | 2.393 | | | | | |
| 65 | 517 | 565 | 803 | 83.3 | 2.386 | | <820 | 2.549E+10 | 1625 | |
| 66 | 521 | 564 | | | 2.395 | | | | | |
| 67 | 503 | 547 | 766 | 82.2 | 2.381 | | <795 | | | |
| 68 | 561 | 609 | | | 2.45 | | | | | |
| 69 | 570 | 619 | | | 2.44 | | | | | |
| 70 | 572 | 621 | | | 2.45 | | | | | |
| 71 | 569 | 620 | | | 2.45 | | | | | |
| 72 | 486 | 530 | | | | | | | | |
| 73 | 479 | 522 | | | 2.46 | | | | | |
| 74 | 485 | 528 | | | 2.46 | | | | | |
| 75 | 479 | 521 | | | 2.47 | | | | | |

TABLE 3

Physical properties of alkali aluminosilicate glasses, post-ion exchange.

| | IX 410° C. 8 hrs | | | IX 370° C. 8 hrs | | |
|---|---|---|---|---|---|---|
| Sample Number | CS (MPa) | DOL (μm) | D (×10⁻¹¹ cm²/s) | Cs (MPa) | DOL (μm) | D (×10⁻¹¹ cm²/s) |
| 1 | 852.864 | 42.497 | 8.170 | 889.87 | 21.85 | 2.159 |
| 2 | 942 | 42.5 | 8.170 | 982.6 | 21.8 | 2.159 |
| 19 | 565 | 73 | 23.876 | 688 | 40 | 7.321 |
| 20 | 472 | 97 | 42.453 | 598 | 54 | 13.393 |
| 21 | 390 | 103 | 47.840 | 496 | 57 | 14.621 |
| 22 | | | | 396 | 61 | 49.022 |
| 23 | 610 | 75 | 25.117 | 718 | 44 | 8.747 |
| 24 | 615 | 73 | 24.237 | 731 | 44 | 8.885 |
| 25 | 644 | 72 | 23.614 | 752 | 41 | 7.736 |
| 26 | 592 | 70 | 22.248 | 723 | 40 | 7.152 |
| 27 | 644 | 63 | 17.753 | 736 | 38 | 6.477 |
| 28 | 635 | 59 | 15.702 | 725 | 33 | 5.061 |
| 29 | 694 | 51 | 11.940 | 828 | 29 | 3.731 |
| 30 | 702 | 58 | 15.090 | 823 | 33 | 4.832 |

TABLE 3-continued

Physical properties of alkali aluminosilicate glasses, post-ion exchange.

| 31 | 659 | 58 | 15.159 | 788 | 34 | 5.254 |
| 32 | 734 | 49 | 10.775 | 827 | 27 | 3.259 |
| 33 | 591 | 66 | 19.987 | 703 | 38 | 6.519 |
| 34 |     |    |        | 550 | 40 | 7.329 |
| 35 | 731 | 48 | 10.287 | 875 | 24 | 2.570 |
| 36 | 755 | 39 | 6.879  | 866 | 21 | 1.924 |
| 37 | 766 | 36 | 5.702  | 926 | 18 | 1.414 |
| 38 | 732 | 39 | 6.772  | 860 | 20 | 1.801 |
| 39 | 730 | 40 | 7.243  | 862 | 22 | 2.198 |
| 40 | 728 | 44 | 8.763  | 831 | 24 | 2.708 |

| | IX 410° C. 8 Hrs | | | IX 370° C. 8 Hrs | | |
|---|---|---|---|---|---|---|
| Sample Number | CS (Mpa) | DOL (μm) | D (×$10^{-11}$) | Cs (Mpa) | DOL (μm) | D (×$10^{-11}$) |
| 41 | 611  | 38 | 6.366  | 718  | 20 | 1.791 |
| 42 | 533  | 37 | 6.327  | 681  | 21 | 1.998 |
| 43 | 799  | 38 | 6.689  | 916  | 21 | 1.970 |
| 44 | 629  | 39 | 7.014  | 740  | 22 | 2.141 |
| 45 | 501  | 44 | 8.72   | 578  | 25 | 2.829 |
| 46 | 1053 | 51 | 11.851 | 1110 | 27 | 3.287 |
| 47 | 804  | 54 | 13.315 | 963  | 30 | 3.976 |
| 48 | 652  | 65 | 19.22  | 793  | 37 | 6.268 |
| 49 | 757  | 48 | 10.517 | 876  | 26 | 3.165 |
| 50 | 680  | 61 | 17.079 | 755  | 35 | 5.685 |
| 51 | 634  | 66 | 19.418 | 746  | 36 | 5.739 |
| 52 | 670  | 63 | 17.755 | 768  | 34 | 5.188 |
| 53 | 691  | 61 | 16.899 | 778  | 34 | 5.130 |
| 54 | 710  | 60 | 16.197 | 765  | 35 | 5.405 |
| 55 | | | | | | |
| 56 | | | | | | |
| 57 | | | | | | |
| 58 | | | | | | |
| 59 | | | | | | |
| 60 | | | | | | |
| 61 | | | | | | |
| 62 | | | | | | |
| 63 | | | | | | |
| 64 | | | | | | |
| 65 | | | | | | |
| 66 | | | | | | |
| 67 | | | | | | |
| 68 | | | | | | |
| 69 | | | | | | |
| 70 | | | | | | |
| 71 | | | | | | |
| 72 | | | | | | |
| 73 | | | | | | |
| 74 | | | | | | |
| 75 | | | | | | |

While typical embodiments have been set forth for the purpose of illustration, the foregoing description should not be deemed to be a limitation on the scope of the disclosure or appended claims. Accordingly, various modifications, adaptations, and alternatives may occur to one skilled in the art without departing from the spirit and scope of the present disclosure or appended claims.

The invention claimed is:

1. An ion exchangeable aluminosilicate glass, the ion exchangeable aluminosilicate glass being free of lithium and comprising 1-10 mol % $P_2O_5$, $Na_2O$, and at least 5 mol % $Al_2O_3$, wherein 77.52 mol % ≥ $SiO_2$+$Al_2O_3$ ≥ 70.04 mol % and $\Sigma R'O$ ≤ 0.5 $P_2O_5$ (mol %), where R'=Mg, Ca, Ba, and Sr, and wherein the glass has a liquidus viscosity of at least 100 kpoise.

2. The ion exchangeable aluminosilicate glass of claim 1, wherein the liquidus viscosity is at least 135 kpoise.

3. The ion exchangeable aluminosilicate glass of claim 1, wherein the glass is ion exchangeable with at least one of sodium, potassium, rubidium, cesium, copper, thallium, and silver.

4. The ion exchangeable aluminosilicate glass of claim 1, wherein potassium has a diffusivity of at least $7.8 \times 10^{-11}$ $cm^2$/sec in the glass.

5. The ion exchangeable aluminosilicate glass of claim 1, wherein potassium has a diffusivity of at least $1.1 \times 10^{-10}$ $cm^2$/sec in the glass.

6. The ion exchangeable aluminosilicate glass of claim 1, wherein the glass has a diffusivity D>exp(−3.8965−13240/T), where the diffusivity is expressed in ($cm^2$/sec) and T is temperature expressed in degrees Kelvin (K).

7. The ion exchangeable aluminosilicate glass of claim 6, wherein the glass is ion exchanged.

8. The ion exchangeable aluminosilicate glass of claim 6, wherein the glass is ion exchanged to a depth in a range from 20 μm up to 150 μm.

9. The ion exchangeable aluminosilicate glass of claim 6, wherein the glass has an outer layer having a compressive stress of at least 200 MPa.

10. The ion exchangeable aluminosilicate glass of claim 1, wherein the glass comprises at least one monovalent metal oxide modifier $R_2O$, wherein $P_2O_5 \leq [\Sigma(R_2O)-Al_2O_3]$.

11. The ion exchangeable aluminosilicate glass of claim 10, wherein the at least one monovalent metal oxide modifier comprises $Na_2O$ and, optionally, at least one of $K_2O$, $Rb_2O$, $Ag_2O$, and $Cs_2O$, and wherein $P_2O_5 \leq [(Na_2O+K_2O+Rb_2O+Ag_2O+Cs_2O)-Al_2O_3]$.

12. The ion exchangeable aluminosilicate glass of claim 1, wherein the aluminosilicate glass is an alkali aluminosilicate glass comprising: 56-72 mol % $SiO_2$; 5-18 mol % $Al_2O_3$; 0-15 mol % $B_2O_3$; 1-10 mol % $P_2O_5$; 3-25 mol % $Na_2O$; and 0-5 mol % $K_2O$.

13. The ion exchangeable aluminosilicate glass of claim 1, wherein the glass is down-drawable.

14. The ion exchangeable aluminosilicate glass of claim 1, wherein the glass, when immersed in a $KNO_3$ molten salt bath at 410° C. for up to six hours, is capable of exchanging $K^+$ ions for $Na^+$ ions in the glass to a depth of at least 50 μm.

15. The ion exchangeable aluminosilicate glass of claim 1, wherein the aluminosilicate glass comprises: 56-72 mol % $SiO_2$; 5-18 mol % $Al_2O_3$; 0-15 mol % $B_2O_3$; 1-10 mol % $P_2O_5$; and 2-20 mol % $Ag_2O$.

16. A method of strengthening a glass article, the method comprising the steps of:
   a. providing the glass article, the glass article comprising an ion exchangeable aluminosilicate glass, wherein the aluminosilicate glass is free of lithium and has a liquidus viscosity of at least 100 kpoise and comprises: 1-10 mol % $P_2O_5$; $Na_2O$; and at least 5 mol % $Al_2O_3$, wherein 77.52 mol % ≥ $SiO_2$+$Al_2O_3$ ≥ 70.04 mol % and $\Sigma R'O$ ≤ 0.5 $P_2O_5$ (mol %), where R'=Mg, Ca, Ba, and Sr; and a plurality of first monovalent cations; and
   b. exchanging at least a portion of the first monovalent cations with second monovalent cations to a depth in a range from 20 μm up to 150 μm in the glass article, wherein the second monovalent cations are different from the first monovalent cations, wherein exchanging the second actions for the first cations in the glass article creates a compressive stress in a region adjacent to a surface of the glass article.

17. The method of claim 16, wherein the first monovalent cations and second monovalent cations are alkali metal cations.

18. The method of claim 16, wherein the step of exchanging at least a portion of the first monovalent cations with second monovalent cations comprises $K^+$ ions for $Na^+$ ions in the glass article to a depth of up to 150 μm in the glass article.

19. The method of claim 16, wherein the second monovalent cations are larger than the first monovalent cations.

20. The method of claim 16, wherein potassium has a diffusivity of at least $1.1 \times 10^{-10}$ cm$^2$/sec in the glass.

21. The method of claim 16, wherein the glass has a diffusivity $D > \exp(-3.8965 - 13240/T)$, where the diffusivity is expressed in (cm$^2$/sec) and T is temperature expressed in degrees Kelvin (K).

22. The method of claim 16, wherein the step of providing the ion exchangeable aluminosilicate glass comprises downdrawing the ion exchangeable aluminosilicate glass.

23. The method of claim 16, wherein the aluminosilicate glass is an alkali aluminosilicate glass comprising: 56-72 mol % $SiO_2$; 5-18 mol % $Al_2O_3$; 0-15 mol % $B_2O_3$; 1-10 mol % $P_2O_5$; 3-25 mol % $Na_2O$; and 0-5 mol % $K_2O$.

24. The method of claim 16, wherein the aluminosilicate glass comprises: 56-72 mol % $SiO_2$; 5-18 mol % $Al_2O_3$; 0-15 mol % $B_2O_3$; 1-10 mol % $P_2O_5$; and 2-20 mol % $Ag_2O$.

25. An ion exchangeable aluminosilicate glass, the ion exchangeable aluminosilicate glass being free of lithium having a liquidus viscosity of at least 100 kpoise and comprising 1-10 mol % $P_2O_5$, $Na_2O$, at least 59.24 mol % $SiO_2$, and greater than 11.09 mol % $Al_2O_3$, wherein $\Sigma R'O \leq 0.5\ P_2O_5$ (mol %), where R'=Mg, Ca, Ba, and Sr.

26. The ion exchangeable aluminosilicate glass of claim 1, wherein the aluminosilicate glass comprises at least 59.24 mol % $SiO_2$, and greater than 11.09 mol % $Al_2O_3$.

27. An ion exchangeable aluminosilicate glass, the ion exchangeable aluminosilicate glass being free of lithium and comprising: 56-72 mol % $SiO_2$; 5-18 mol % $Al_2O_3$; 0-15 mol % $B_2O_3$; 0.1-10 mol % $P_2O_5$; 3-25 mol % $Na_2O$; and 2-20 mol % $Ag_2O$, wherein the glass has a liquidus viscosity of at least 100 kpoise.

28. The ion exchangeable aluminosilicate glass of claim 27, wherein the glass is ion exchanged to a depth in a range from 20 μm up to 150 μm.

29. The ion exchangeable aluminosilicate glass of claim 28, wherein the glass has an outer layer having a compressive stress of at least 200 MPa.

30. The ion exchangeable aluminosilicate glass of claim 27, wherein the glass further comprises at least one of $K_2O$, $Rb_2O$, and $Cs_2O$, wherein $P_2O_5 \leq [\Sigma(R_2O) - Al_2O_3]$.

31. The ion exchangeable aluminosilicate glass of claim 25, wherein the glass is ion exchanged to a depth in a range from 20 μm up to 150 μm.

32. The ion exchangeable aluminosilicate glass of claim 25, wherein the glass has an outer layer having a compressive stress of at least 200 MPa.

33. The ion exchangeable aluminosilicate glass of claim 25, wherein the glass further comprises at least one of $K_2O$, $Rb_2O$, and $Cs_2O$, wherein $P_2O_5 \leq [\Sigma(R_2O) - Al_2O_3]$.

34. The ion exchangeable aluminosilicate glass of claim 25, wherein the aluminosilicate glass is an alkali aluminosilicate glass comprising: at least 59.24 mol % $SiO_2$; greater than 11.09 mol % $Al_2O_3$; 0-15 mol % $B_2O_3$; 1-10 mol % $P_2O_5$; 3-25 mol % $Na_2O$; and 0-5 mol % $K_2O$.

* * * * *